L. J. DYKE.

Covers for Coffee-Roasters.

No. 136,980.

Patented March 18, 1873.

UNITED STATES PATENT OFFICE.

LODIRE J. DYKE, OF HAMILTON, NEW YORK.

IMPROVEMENT IN COVERS FOR COFFEE-ROASTERS.

Specification forming part of Letters Patent No. 136,980, dated March 18, 1873.

*To all whom it may concern:*

Be it known that I, LODIRE J. DYKE, of Hamilton, in the county of Madison and State of New York, have invented an Improved Culinary Utensil, for use as a coffee-roaster, corn-popper, broiler, and toaster, of which the following is a specification:

My invention consists in a cover for coffee-roasters, broilers, and other kitchen and laundry utensils, said cover being made of sheet metal, preferably in semicircular form in cross-section, open at the bottom and closed at the ends, and provided with upper and lower bearings at the ends, arranged to admit the ready application of the cover to either a roasting-cylinder or rotary broiler, as hereinafter fully described.

Figure 1:
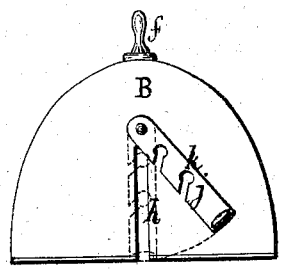
Figure 2:
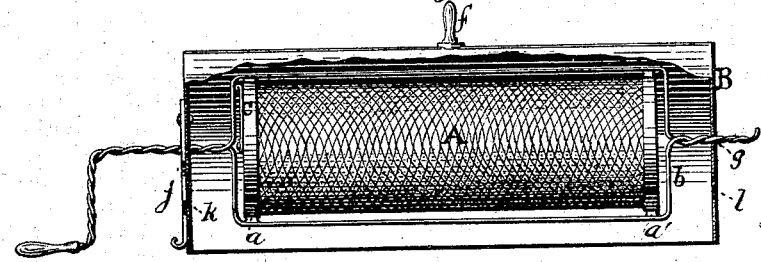
Figure 3:
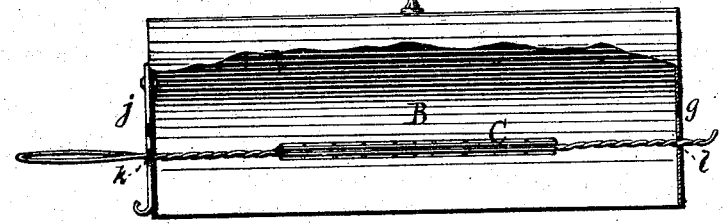
Figure 4:
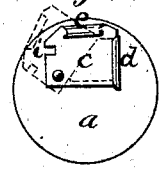

In the drawing, Figure 1 is an end elevation of the cover. Fig. 2 is a side view of the rotary cylinder fitted within the cover, which is partly broken away to expose the interior. Fig. 3 is a similar view of the broiler. Fig. 4 is an end view of the cylinder.

Similar letters of reference indicate like parts in the several figures.

The cylinder A is preferably made of rather coarse wire gauze or netting, provided with sheet-metal heads *a a'*, and is fitted in a rectangular frame, *b*, of wire, which is bent around the cylinder, as shown in Fig. 2, and has its ends twisted to form journals. Any other suitable construction of frame may be adopted, the object being to avoid a central shaft running through the cylinder. One of the journals is formed into a crank and provided with a wooden handle, while the end of the other is slightly bent up, as shown. The cylinder is provided with an opening for the introduction of coffee or corn. I prefer to locate this opening in one of the heads *a a'* and provide it with a cover, *c*, pivoted at one corner and fitting under a lip, *d*, formed at the edge of the opening. The upper edge of the cover is turned over at *e* to form a handle, and a catch, *i*, is provided as a fastening. The cylinder A is mounted in a sheet-metal cover, B, which is nearly semi-cylindrical in cross-section. This cover is open at the bottom, as shown, and at the top a handle, *f*, is provided. The cylinder is removable from the cover, one of the journals having its bearing in a hole, *g*, while the other enters a slot, *h*, in the opposite end of the cover, and is held in place by means of a slotted plate, *j*, pivoted at its upper end.

I prefer to adapt the cover B for use with a broiler and toaster, C, Fig. 3; and for this purpose bearings *k l* are provided below those for the cylinder, so that when the latter is removed the broiler may be substituted, its journals being inserted in the lower bearings to give room for turning within the cover.

The body of the broiler may be of the usual construction—that is, two parts hinged together to inclose the meat or bread.

When the utensil is in use the cover rests on top of the stove, over one of the openings therein, the ordinary stove-griddle or hole-cover being removed. This cover confines the heat, but permits its diffusion around and through the cylinder or broiler, at the same time preventing the escape of the odors of the meat or the smoke of the coffee into the apartment.

By the use of the cover all the advantages of broiling, toasting, or roasting over an open fire are obtained without the disadvantage of having the fire die down by reason of the stove being uncovered.

When the cylinder is in use for roasting coffee or popping corn, it is constantly revolved, and thus the article is evenly done and kept from burning.

The broiler is revolved frequently, but not continuously, when broiling meat; but in toasting bread one side is first toasted to the desired extent, and then the other side is exposed to the fire by turning the handle a half revolution.

The cover may be placed over flat-irons on the stove, and is found to hasten the operation of heating by confining the heat to the immediate vicinity of the iron.

I am aware that it is not new to use, in connection with a broiler, a cover setting over the same, the bearings in which the journals of the broiler revolve being independent of said cover; but this forms no part of my invention, and I do not, therefore, claim it.

Having thus described my invention, what

I claim as new, and desire to secure by Letters Patent, is—

The cover B provided with a handle, $f$, bearings $g\ l$, slot $h$, and the pivoted piece $j$ having sockets $k$, all constructed and arranged substantially as described, for the purpose specified.

To the above I have signed my name this 13th day of November, A. D. 1872.

LODIRE J. DYKE.

Witnesses:
    M. HUBBARD,
    A. L. ROY.